E. A. BOHLMAN.
METALLIC POWER BELT.
APPLICATION FILED MAY 23, 1912.
1,113,536.
Patented Oct. 13, 1914.
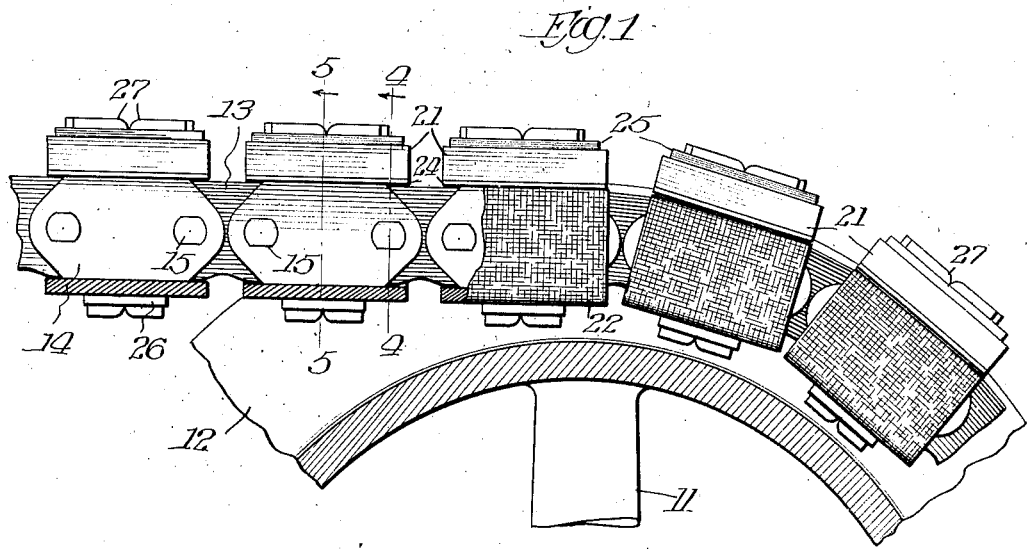
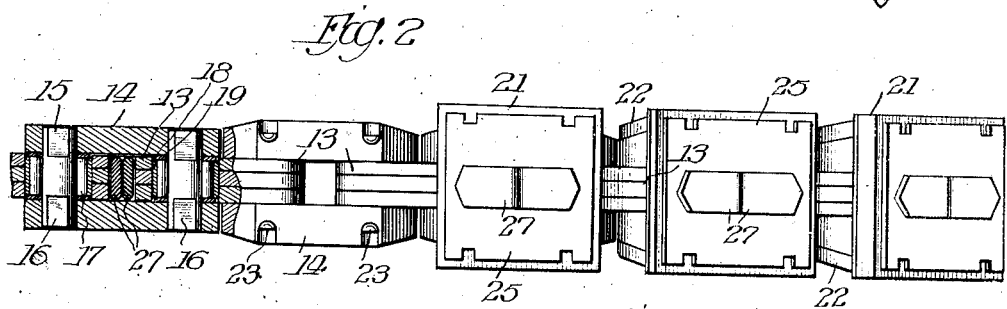
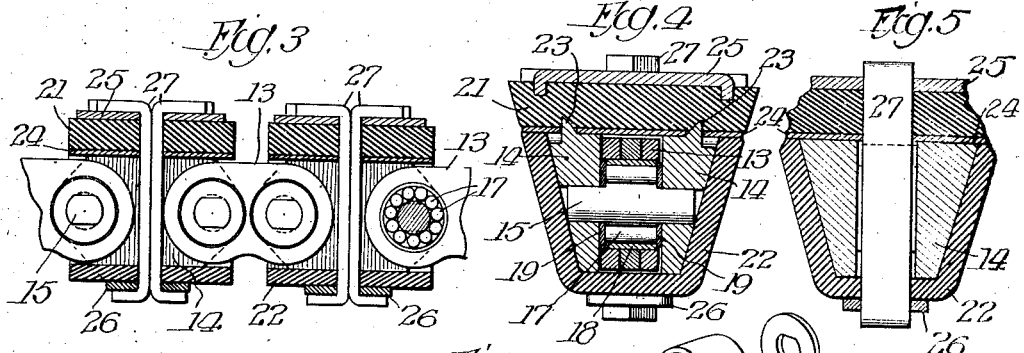
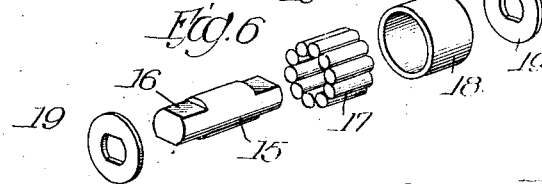
Witnesses:
Inventor:
Ernest A. Bohlman
by Linthicum Belt & Fuller
Attys.

UNITED STATES PATENT OFFICE.

ERNEST A. BOHLMAN, OF CEDAR RAPIDS, IOWA, ASSIGNOR TO JAMES E. CAGNEY, JR., OF CHICAGO, ILLINOIS.

METALLIC POWER-BELT.

1,113,536.

Specification of Letters Patent.

Patented Oct. 13, 1914.

Application filed May 23, 1912. Serial No. 699,152.

*To all whom it may concern:*

Be it known that I, ERNEST A. BOHLMAN, a citizen of the United States, residing at Cedar Rapids, in the county of Linn and State of Iowa, have invented certain new and useful Improvements in Metallic Power-Belts, of which the following is a specification.

This invention relates in general to power belts for transmitting power from one pulley to another and, more particularly, to that class of belts known as chain belts and aims to provide a belt of this type which will be strong, durable and efficient and at the same time sufficiently flexible so that it may be used on pulleys of small diameter and on pulleys mounted closely together and, furthermore, to provide a belt which will not require lubrication and which will be cheap to manufacture, easy to assemble and durable in operation.

Other objects and many of the advantages of the present invention will be apparent to those skilled in the art as it is better understood by reference to the following description when considered in connection with the accompanying drawings illustrating one preferred embodiment thereof.

Referring to the drawings Figure 1 is a side elevation of a section of a belt showing its relation to the pulley around which it travels; Fig. 2 is a plan view thereof; Fig. 3 is a longitudinal sectional view; Fig. 4 is a transverse sectional view on the line 4—4 of Fig. 1; Fig. 5 is a similar view on the line 5—5 of Fig. 1; and Fig. 6 is a detail perspective view of the parts comprising the anti-friction connection between the pins and the links.

On the drawings 11 designates a power pulley provided with a peripheral V-shaped slot or groove 12 for the reception of my improved belt. The belt is made up of alternately arranged links 13 and side bars 14 disposed in pairs on opposite sides of the links. Each pair of side bars is connected together at its ends by pins or pintles 15 which project through bearing openings or apertures formed in the ends of the links. The ends of the pintles are preferably flattened, as indicated by 16, and the holes in the side bars into which these ends project are similarly shaped so that the pins are prevented from turning in the bars. The pins may be securely and rigidly fastened in the side bars by driving them in or expanding the ends of the pins, or compressing the side bars around them. The central portion of each pin disposed within the link is cylindrical in shape and around this portion is arranged a series of anti-friction bearing rollers 17 which, in turn, are encircled by a cylindrical housing 18 adapted to fit within the aperture in the link. A pair of disks 19 adapted to fit over the ends of the pin are positioned between the ends of the bearing rollers and the inner faces of the side bars whereby the rollers are held against longitudinal displacement and maintained in proper position. This construction provides a very flexible joint between the side bars and the links and permits the belt to run freely and without cramping or binding and, also, provides a very flexible joint which adapts the belt for use on pulleys of small diameter.

For the purpose of securing friction between the sides of the belt and the sides of the pulley groove, I mount upon the top of each pair of side bars a friction block 21 composed of stiff leather, or other frictional material and, to the bottom of each pair of side bars, I secure a strip of canvas, leather, or other frictional material 22 the free ends of which project up over the outer faces of the side bars in position to frictionally engage with the sides of the pulley grooves. The block 21 is held in position by shoulders or lips 23 struck up from the tops of the side bars in position to be inserted into the bottom of the block. A metal plate 24 provided with suitable apertures to fit over the lips 23 is interposed between the tops of the bars and the block to prevent wearing of the bottom face of the block. A top plate 25 is disposed over the top of the block and a bottom plate 26 is positioned beneath the strip of frictional material 22, the plates 25 and 26 being clamped together to hold the friction block 21 and the friction strip 22 in position by means of rivets 27, or other preferred fastening means.

It will be manifest that frictional engagement between the sides of the pulley groove and the belt is obtained by the friction strip 22 and the friction block 21 and that a strong and durable, but at the same time flexible, anti-friction bearing is provided between the side bars and the connecting links. When the parts are assembled the housing in which the bearing rollers are disposed is preferably packed with lubricant so that the belt may be used continuously without oiling. This feature is of material advantage since the application of oil to the exterior of the belt will materially decrease its frictional power, particularly, if the oil is permitted to be deposited on the friction members and, also, decreases the life of the belt since dust and grit will collect in the oil and eventually work into the bearings. In the present construction the bearings are anti-frictional in nature by reason of the interposed rollers and these rollers are entirely closed by the housing 18 and the disks 19 so that dust and dirt are excluded.

It is believed that my invention and its operation will be understood from the foregoing without further description and it will be obvious that the structural details may be varied within considerable limits without departing from the spirit of the invention or sacrificing any of the material advantages thereof.

I claim:

The combination of a pair of side members having apertures each provided with a pair of oppositely disposed parallel walls, a cylindrical pin having flattened ends adapted to fit tightly in said apertures, a central member mounted to pivot on said pin and having a perforation through which said pin is disposed, a cylindrical casing of length less than the width of said central member disposed in said perforation, a plurality of anti-friction elements disposed in said casing and surrounding said pin, and a pair of disks of diameter greater than the internal diameter of said casing fitting in the ends of said perforations and provided at their centers with apertures shaped to fit snugly the flattened ends of said pins, whereby said pin, sidebars and disks are rigidly held together and the disks in contact with the ends of said casing.

ERNEST A. BOHLMAN.

Witnesses:
JOHN R. McGUIRE,
WILLIAM F. CAGNEY.